(12) United States Patent
Kirkland et al.

(10) Patent No.: US 6,315,304 B1
(45) Date of Patent: Nov. 13, 2001

(54) ADJUSTABLE TRUCK ASSEMBLY FOR SKATEBOARDS

(76) Inventors: Eric W. Kirkland, 166 Sunset Ter., Laguna Beach, CA (US) 92651; Lewis J. Bangham, 1793 Lafayette St., Studio 240, Santa Clara, CA (US) 95050; Brad D. Hepler, 1793 Lafayette St., Studio 240, Santa Clara, CA (US) 95050; Gregory Staples, 1793 Lafayette St., Studio 240, Santa Clara, CA (US) 95050; Theodore L. Renteria, 1793 Lafayette St., Studio 240, Santa Clara, CA (US) 95050

( * ) Notice: Subject to any disclaimer, the term of this patent is extended or adjusted under 35 U.S.C. 154(b) by 0 days.

(21) Appl. No.: 09/476,863

(22) Filed: Jan. 3, 2000

(51) Int. Cl.$^7$ ...................................................... B62M 1/00
(52) U.S. Cl. ................................... 280/11.28; 280/87.042
(58) Field of Search ............................. 280/11.19, 11.28, 280/11.22, 11.27, 11.23, 87.041, 87.042, 842, 22.1

(56) References Cited

U.S. PATENT DOCUMENTS

| | | | |
|---|---|---|---|
| 2,763,490 | 9/1956 | Crone | 280/11.28 |
| 4,047,725 | 9/1977 | Pinchock | 280/11.28 |
| 4,071,256 | 1/1978 | Kimmell | 280/11.28 |
| 4,109,925 | * 8/1978 | Williams et al. | 280/87.041 |
| 4,125,268 | * 11/1978 | Varner et al. | 280/11.28 |
| 4,168,842 | * 9/1979 | Kimmell et al. | 280/11.28 |
| 4,738,456 | 4/1988 | Creason | 280/11.1 BT |
| 4,930,794 | 6/1990 | Chan | 280/11.28 |
| 5,052,702 | 10/1991 | Chan | 280/11.28 |
| 5,232,235 | * 8/1993 | Brooks | 280/87.042 |
| 5,853,182 | 12/1998 | Finkle | 280/87.042 |
| 6,003,881 | * 12/1999 | Ellis et al. | 280/11.2 |

FOREIGN PATENT DOCUMENTS

4202859 * 8/1993 (DE).
2431309 * 2/1980 (FR).

* cited by examiner

Primary Examiner—Brian L. Johnson
Assistant Examiner—Bryan Fischmann
(74) Attorney, Agent, or Firm—John J. Connors; Connors & Associates

(57) ABSTRACT

A truck assembly for a skateboard includes an axle housing, a base, and a kingpin connecting the axle housing and base. The kingpin holds the axle housing and a base surface of the base a predetermined distance apart. The truck further includes a turning mechanism between the axle housing and base, around the kingpin. The turning mechanism includes opposed cam surfaces that are angled along the axis of the kingpin and an elastomeric bushing so that rotating the axle housing about the kingpin pushes the cam surfaces apart, against the compression pressure of the elastomeric bushing. The truck assembly additionally includes an adjustment mechanism for adjusting the pressure against the bushing. The adjustment mechanism includes an adjustment surface on the base of the truck assembly with two or more adjustment points, each a different distance from the base surface along the direction of the kingpin. An adjustment ring surrounds the kingpin, between the base surface and the turning mechanism. The adjustment ring includes adjustment lobes that engage the adjustment surface on the base.

14 Claims, 9 Drawing Sheets

ADJUSTABLE TRUCK ASSEMBLY FOR SKATEBOARDS

CROSS-REFERENCE TO RELATED APPLICATIONS

Not Applicable

FEDERALLY SPONSORED RESEARCH AND DEVELOPMENT

Not Applicable

BACKGROUND OF THE INVENTION

FIELD OF THE INVENTION

The present invention relates to wheeled truck assemblies, in particular, wheeled truck assemblies for skateboards, and in further particularity, wheeled truck assemblies for skateboards that provide a directional turning capability.

BACKGROUND OF THE INVENTION

Skateboards and certain types of roller skates are supported by wheeled truck assemblies. Although the invention (including its background) is described in connection with skateboards, those skilled in the art will recognize that the invention may be used for other types of devices, such as certain types of roller skates, street luges, and others.

In a typical configuration, a skateboard has an elongated deck with a longitudinal axis. The deck is supported by two wheeled truck assemblies that are attached to the underside of the deck. In these typical configurations, one truck assembly is attached relatively near each end of the skateboard deck. The wheeled truck assemblies typically include an axle that is substantially orthogonal to the longitudinal axis of the skateboard deck. The truck assembly (including the axle) is typically symmetrical about the longitudinal axis of the skateboard deck. A wheel is attached to each end of the axle.

The wheeled truck assembly typically includes a pivoting mechanism that changes the orientations of the axle with respect to the skateboard deck. Such pivoting provides directional turning capability, allowing the rider to provide directional control to the skateboard. An exemplary truck assembly including a pivoting mechanism is shown in U.S. Pat. No. 5,853,182 to Finkle. In accordance with the teaching of that patent, an axle assembly is supported on an elastomeric bumper, which in turn is supported on an angled shaft. As the skateboard deck is tilted, the bumper twists, causing the axle of the truck assembly to tilt and turn. The degree of hardness of the elastomeric material forming the bumper affects the relationship between the turning of the truck axle and the pressure applied by the rider to tilt the skateboard deck. Generally, a harder elastomeric material provides less turning of the axle direction for a given pressure on the skateboard deck than does a softer elastomeric material. Thus, the harder elastomeric material requires greater pressure to achieve the same degree of turning.

The range of turning movement available with the elastomeric bumper is limited by the tensile strength of the elastomeric material as the bumper is twisted. In certain circumstances, some riders may desire a greater degree of turning than is available with such elastomeric bumpers. This is particularly true for riders of exceptionally long skateboards (for example, 3–4 feet (0.9–1.2 m) in length).

Some skateboard riders desire a high degree of predictability to the tilting pressure required to execute particular turns. Because of inherent variations in the compounds used for the elastomeric bumper, the turning performance of skateboard trucks using such elastomeric bumpers may not have the desired degree of predictability.

An additional desired feature for some skateboard riders has been to adjust the degree of turning achieved with a particular application of force, or conversely to adjust the amount of force necessary to achieve a particular turning angle for the axle. Such adjustment is possible with the skateboard trucks incorporating an elastomeric bumper by substituting a bumper having a different elastomeric hardness. Such substitution requires disassembly of the truck, a time-consuming activity that typically requires one or more tools. In addition, because of the inherent differences in the performance of different elastomeric compounds from which the bumpers are made, the desired level of turning performance is not always achieved on the first substitution, thereby requiring repeated disassembly and reassembly of the truck.

Some have suggested using springs to control the degree of turning relative to a particular amount of tilting force applied to the skateboard deck. However, such configurations incorporate separate springs on each side of the axle, which springs must be carefully adjusted to achieve balanced performance between the two sides. Changing the tension on such springs to alter the performance of the skateboard is very difficult.

SUMMARY OF THE INVENTION

The present invention is a truck assembly for skateboards and similar devices that provides a large turning range for the axle, provides a highly predictable turning performance, and provides tool less adjustment of the turning performance.

It is an object of the present invention to provide a wheeled truck assembly for a skateboard that permits the skateboard to have a small turning radius.

It is an object of the present invention to provide a wheeled truck assembly with a large axle turning range.

It is an object of the present invention to provide a wheeled truck assembly that permits a sharp turning angle for the axle.

It is an object of the present invention to provide a wheeled truck assembly having a highly predictable turning performance.

It is an object of the present invention to provide a wheeled truck assembly having a stable turning performance.

It is an object of the present invention to provide a wheeled truck assembly having an adjustable turning performance.

It is an object of the present invention to provide a wheeled truck assembly in which the turning performance may be adjusted without the use of tools.

It is an object of the present invention to provide a wheeled truck assembly that provides adequate clearance for the use of large wheels.

The truck assembly of present invention includes an axle housing, a base, and a kingpin connecting the axle housing and base. The kingpin holds the axle housing and a base surface of the base a predetermined distance apart. The truck further includes a turning mechanism between the axle housing and base, around the kingpin. The turning mechanism includes opposed cam surfaces that are angled along the axis of the kingpin to control the rotation of the axle housing about the kingpin axis off of center position, and to tend to return the axle housing to its center, straight-ahead position. In particular, the turning mechanism includes an axle housing cam face on the axle housing, with the axle housing cam face having at least two cam surfaces. A cam element between the base and the axle housing includes a cam face with at least two cam surfaces that engage the cam surfaces of the axle housing cam face. A resiliently compressible bushing spaces the cam face of the cam element from the base.

The truck assembly of the present invention additionally includes an adjustment mechanism for adjusting the pressure with which the opposed cam faces oppose one another. The adjustment mechanism includes an adjustment surface on the base of the truck assembly with two or more adjustment points, each a different distance from the base surface along the direction of the kingpin. An adjustment ring surrounds the kingpin, between the base surface and the turning mechanism. The adjustment ring includes adjustment lobes that engage the adjustment surface on the base, so that positioning the adjustment lobes at different ones of the adjustment points positions the adjustment ring at different distances from the base surface.

DETAILED DESCRIPTION OF A PREFERRED EMBODIMENT

Figure 1:
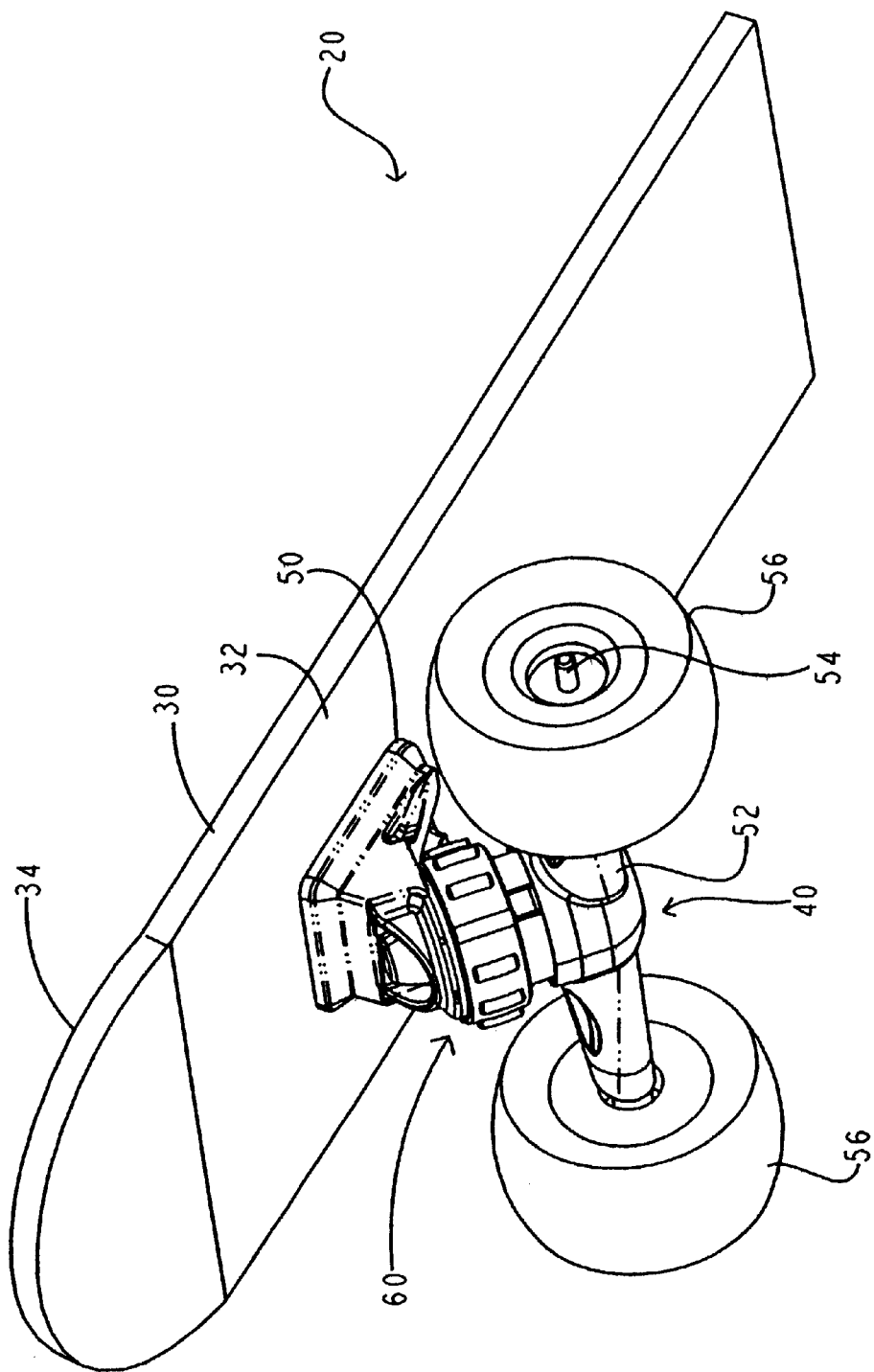
FIG. 1 is a bottom side view of the front portion of a skateboard including a truck assembly constructed in accordance with the present invention.
Figure 2:
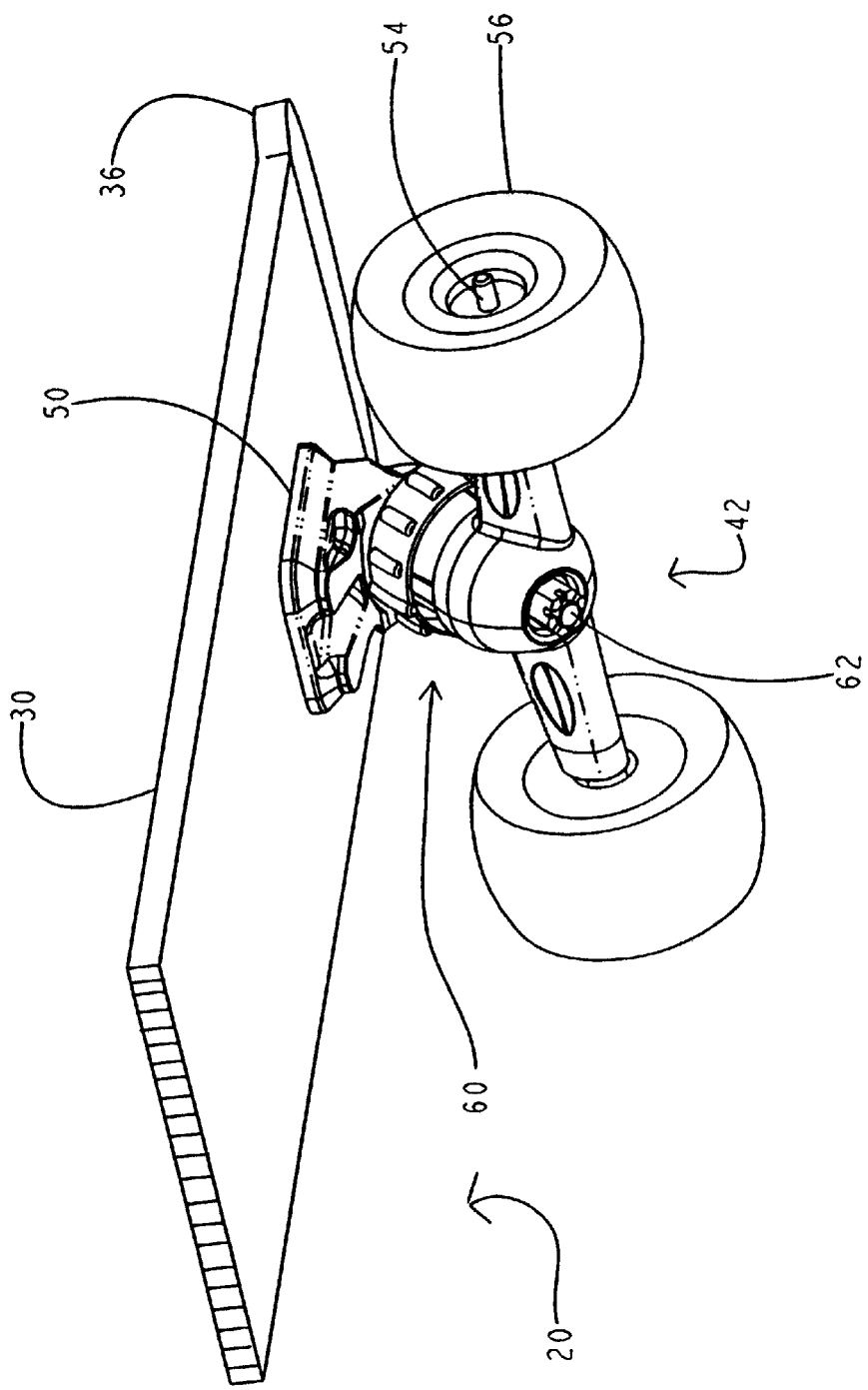
FIG. 2 is a bottom side view of the rear portion of a skateboard including a rear truck assembly constructed in accordance with the present invention.

Referring first to FIGS. 1 and 2, a skateboard 20 includes a deck 30 supported by one or more wheeled truck assemblies 40, 42. The preferred embodiment of the present invention is described herein in conjunction with a skateboard. However, those skilled in the art will recognize that the wheeled truck assembly may be attached to other types of deck surfaces, including roller skates, street luges, and similar devices.

The skateboard deck 30 includes an upper surface and an underside 32, and includes a longitudinal axis extending from the front to the rear of the deck, midway between the left and right side edges. The front and rear ends 34, 36 of the deck 30 may be turned up. A front truck assembly 40 (FIG. 1) and a rear truck assembly 42 (FIG. 2) support the skateboard deck. Each truck assembly 40, 42 is attached to the underside 32 of the skateboard deck, and is generally symmetrical about the longitudinal axis of the skateboard deck.

The front and rear truck assemblies 40, 42 are generally identical. Therefore, the same reference numerals will be used to identify the components of each. Referring to the front truck assembly shown in FIG. 1, the truck assembly includes a base 50 secured to underside 32 of the deck. An axle housing 52 encloses an axle 54, at each end of which a wheel 56 is rotationally attached. An adjustable turning mechanism 60 connects the axle housing 52 and the base 50. The adjustable turning mechanism 60 permits the axle housing 52 to tilt relative to the base 50 and the deck 30, and to pivot about a pivot point 62 (FIG. 2) so that as the axle housing 52 tilts with respect to the base and the deck, the axle 54 moves through an arc, to turn the axle relative to the deck, and change the rolling direction of the wheels 56.

Figure 3:
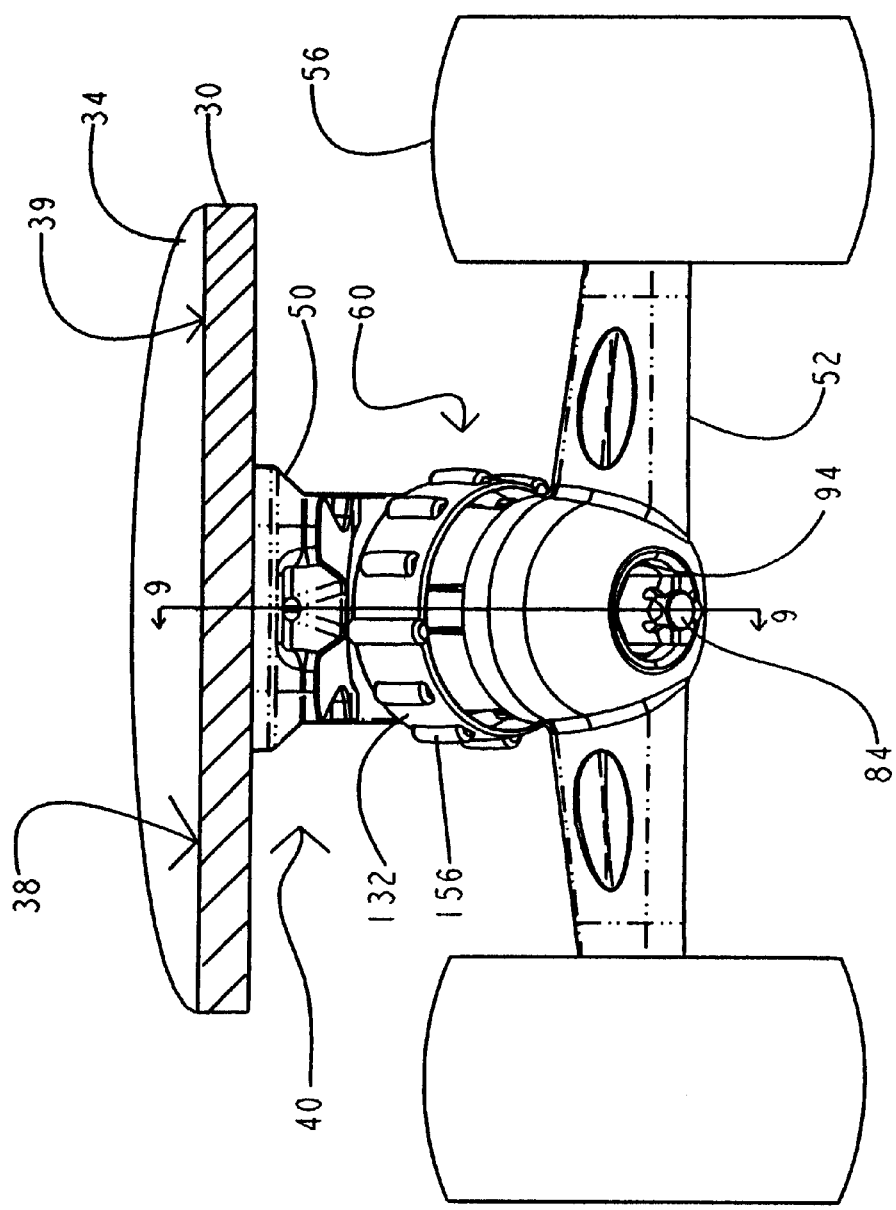
FIG. 3 is a view of a skateboard truck assembly constructed in accordance with the present invention, the view taken from the central region of the skateboard.

The adjustable turning mechanism 60 of each of the front and rear truck assemblies allows a person riding on the top surface of the skateboard deck 30 to steer the skateboard by shifting the rider's weight between the left and right sides 38, 39 of the skateboard deck (FIG. 3). The rider applies weight to the left side 38 of the skateboard deck 30 to steer the skateboard toward the left, and applies weight to the right side 39 of the skateboard deck to steer the skateboard toward the right.

Referring to FIG. 1, which shows the front truck assembly 40, the adjustable turning mechanism is configured so that as the axle housing pivots, the axle housing turns to cause the wheels to point in the direction of the tilt of the skateboard deck. Thus, as the axle housing tilts relative to the base to bring the left end of the front axle closer to the deck, the axle pivots in a counterclockwise direction (as viewed from the deck), so that the axle moves through a counterclockwise arc to cause the wheels to be pointed toward the left side. As axle housing tilts relative to the base to bring the right end of the front axle closer to the deck, the axle pivots in a clockwise direction (as viewed from the deck), so that the axle moves clockwise through an arc to cause the wheels to be pointed toward the right side of the skateboard.

In some installations, the rear truck assembly 42 may be attached to the deck so that the rear axle pivots in the opposite direction of the tilt of the skate board deck. Referring now to FIG. 2, which shows the rear truck assembly, the adjustable turning mechanism may be configured so that as the axle housing tilts and pivots, the axle housing pivots to cause the wheels to point in the direction opposite the tilt of the skateboard deck. Thus, as the axle housing tilts relative to the base to bring the left end of the rear axle closer to the deck, the axle pivots in a clockwise direction (as viewed from the deck), so that the axle moves through an arc to cause the wheels to be pointed toward the right side of the skateboard deck. Similarly, as the rear axle housing tilts relative to the deck so that the right end of the rear axle moves closer to the deck, the rear axle pivots in a counter clockwise direction to move the axle through an arc and cause the wheels to be pointed toward the left side of the skateboard deck. Such counter directional movement allows both axles to aid in steering the skateboard, providing greater directional capability for the skateboard, and a sharper turning radius.

However, those skilled in the art will recognize that the front and rear trucks 40, 42 may also be oriented in the same direction.

The turning mechanism is angled with respect to the plane of the skateboard deck to provide greater turning movement for the axles for a given tilting of the deck.

FIG. 3 is a view of the front a truck assembly, taken from a point between the front and rear assemblies, and showing the base of the truck assembly securely attached to the underside of the skateboard deck 30. The left and right wheels 56 are supported by an axle (not visible in FIG. 3) contained within the axle housing 52. The wheels are mounted on the ends of the axle using conventional ball bearing attachments. The wheels may be formed of either wear-resistant polyurethane, or a softer rubber-like material for traction. As is known in the art, the wheels may be smooth or treaded. Although wheels of different size may be used, the embodiment illustrated incorporates wheels having a diameter of approximately 4.5–4.7 inches (11.4–11.9 cm). In the view shown in FIG. 3, the axle housing 52 is in its center position, so that the axle is perpendicular to the centerline of the skateboard deck. In this center position, the wheels 56 at the ends of the axle are directed straight ahead relative to the skateboard deck.

Figure 4:
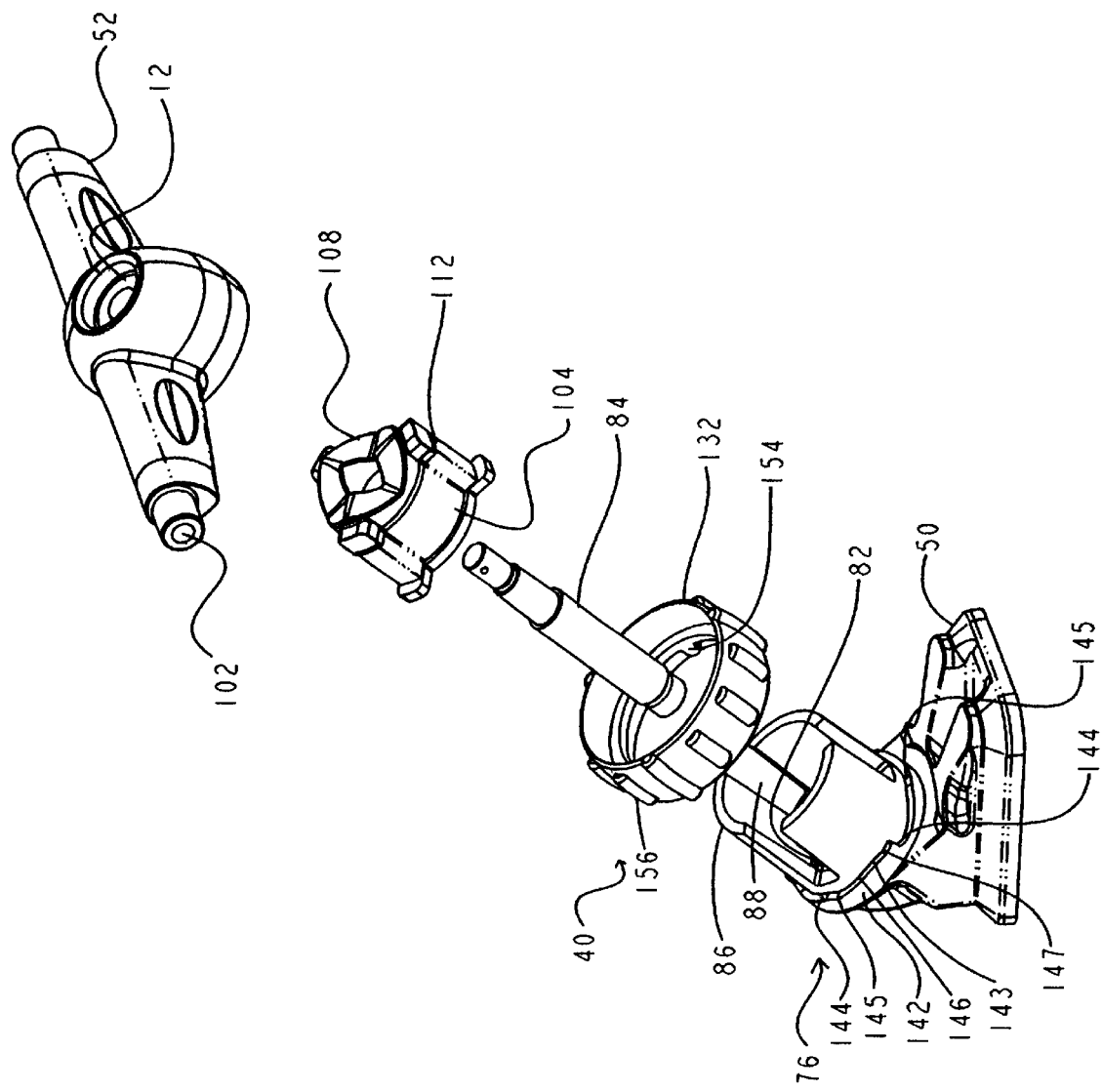
FIG. 4 is a partially exploded view of the skateboard truck assembly.
Figure 5:
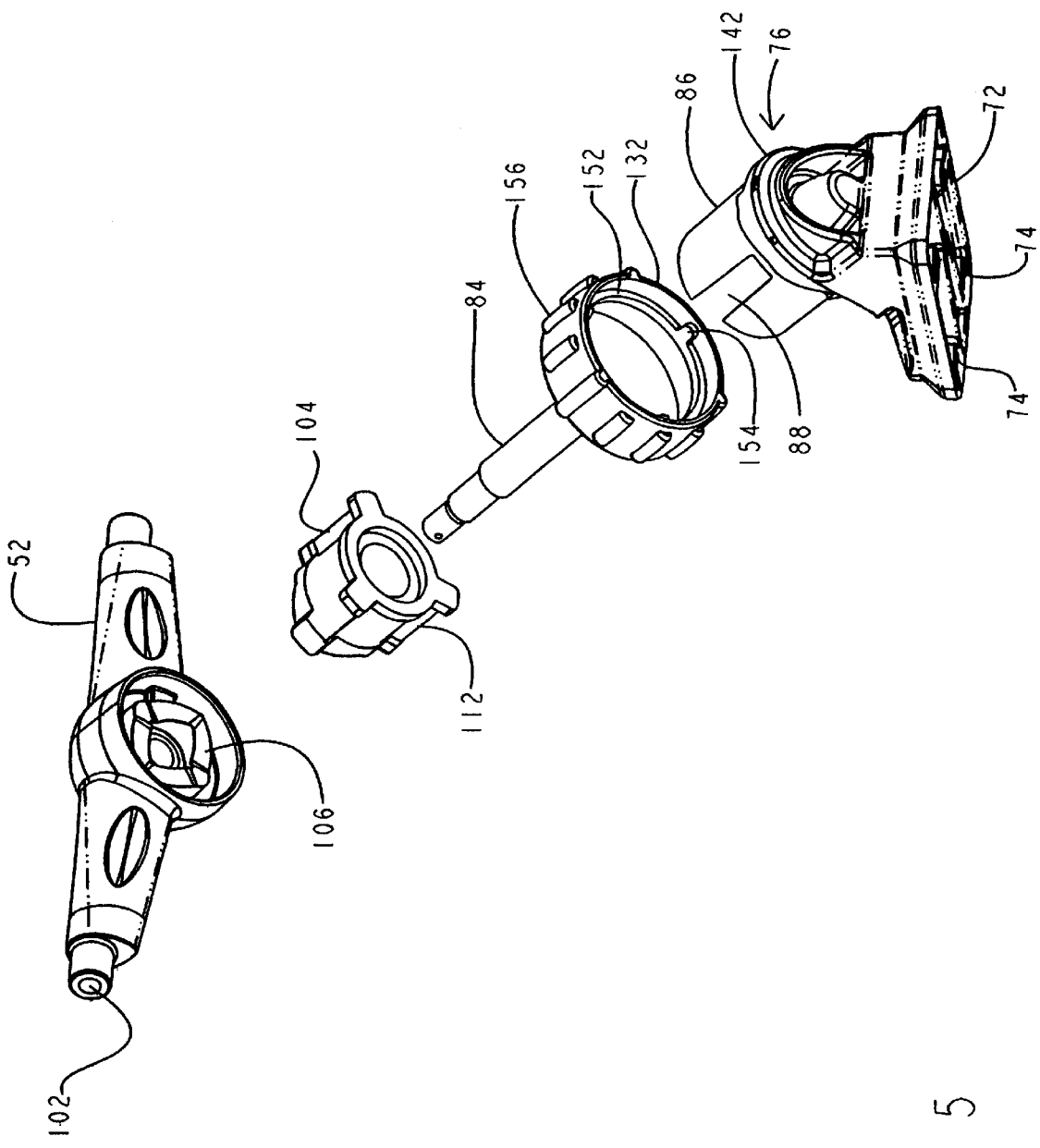
FIG. 5 is another partially exploded view of the skateboard truck assembly.
Figure 6:
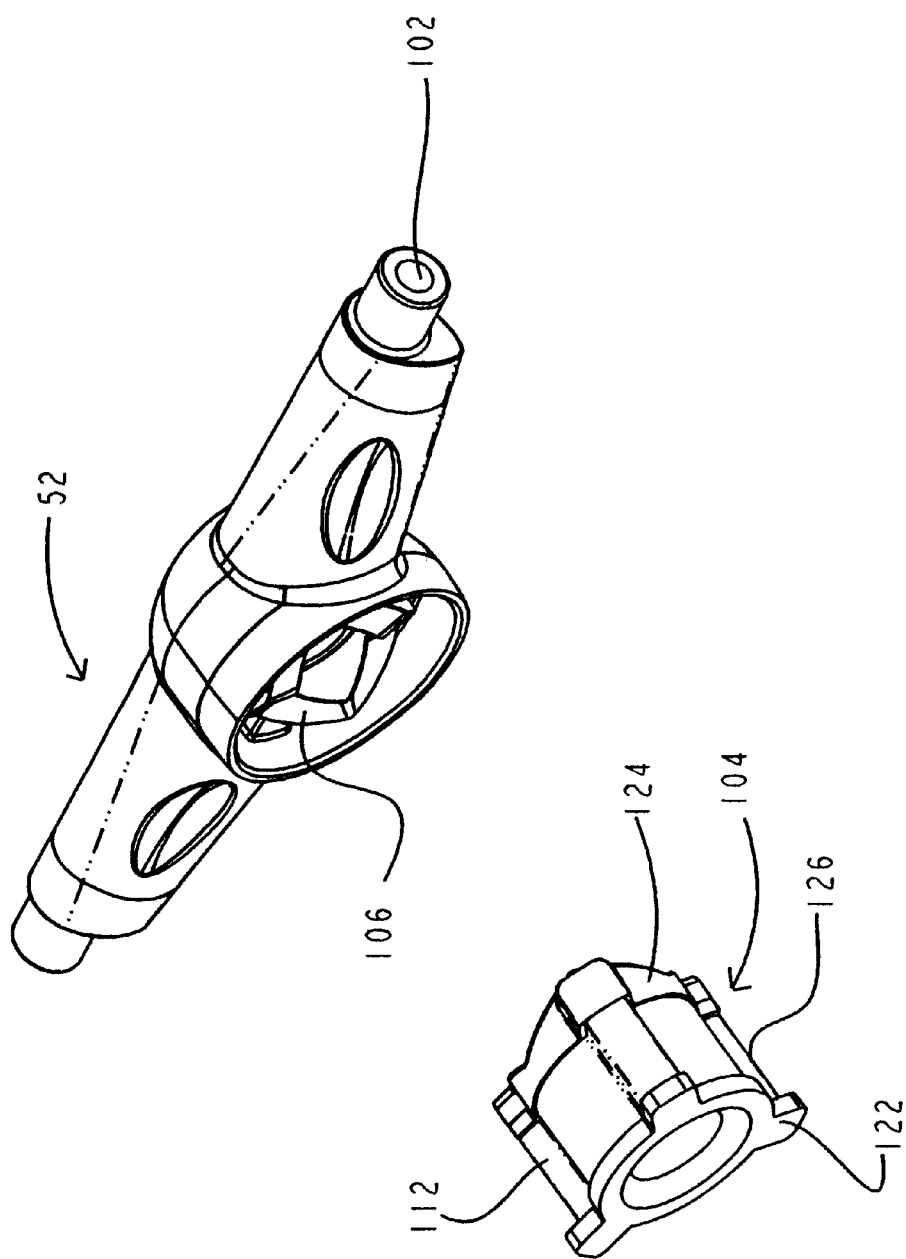
FIG. 6 is a partially exploded view of the axle housing and cam element of the truck assembly.
Figure 7:
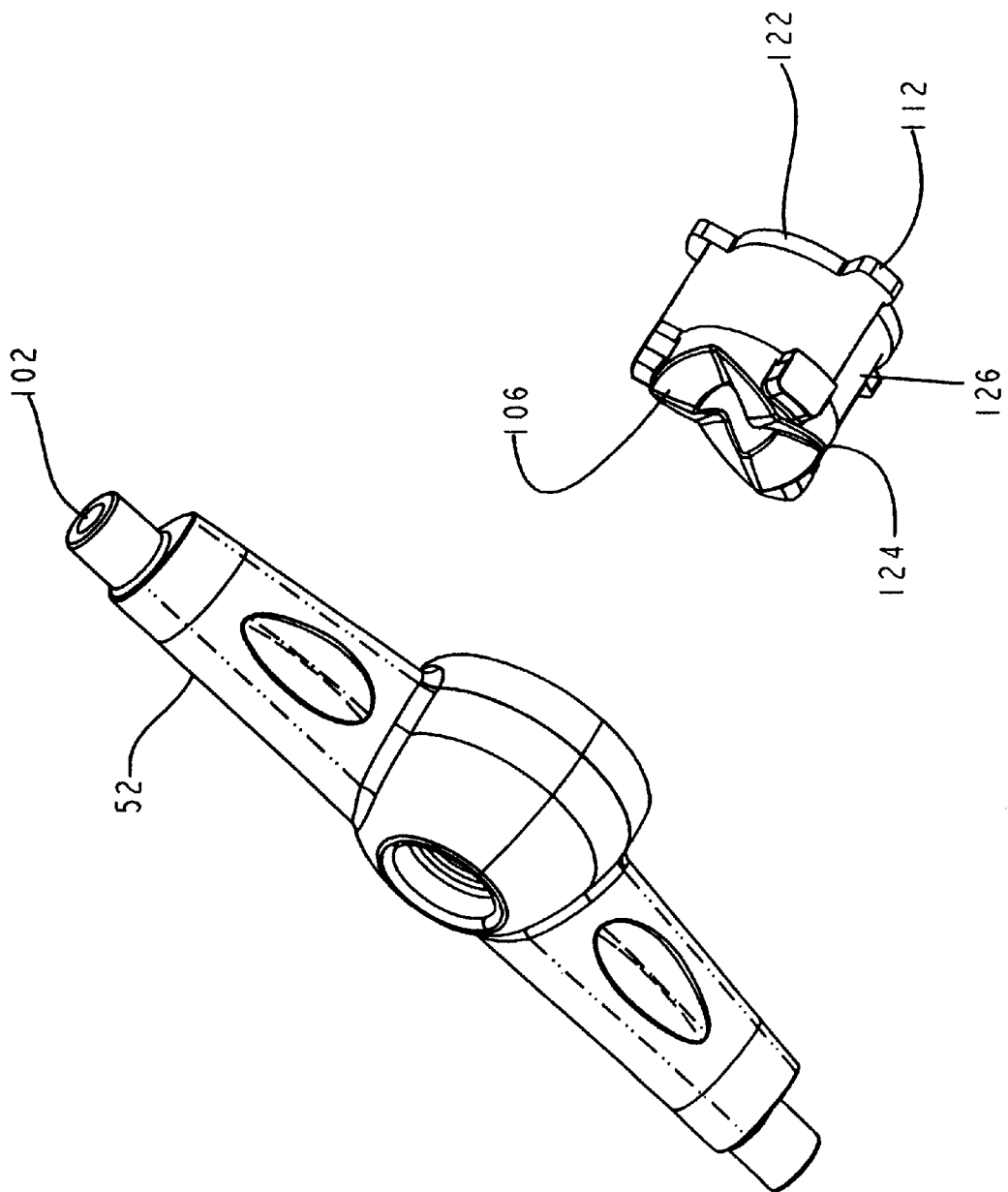
FIG. 7 is another partially exploded view to the axle housing and cam element of the truck assembly.
Figure 9:
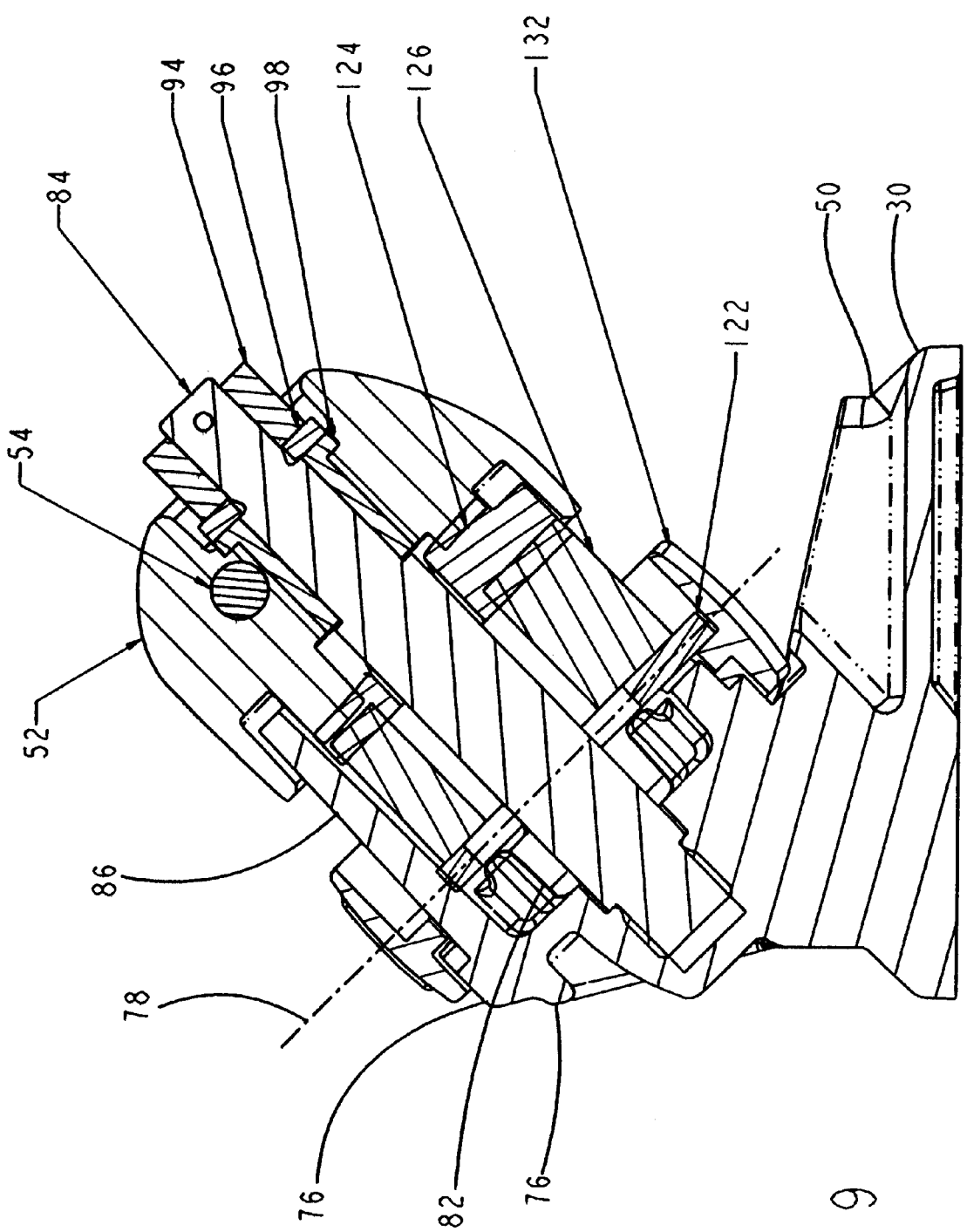
FIG. 9 is a cross-sectional view of the truck assembly, taken along line 9—9 of FIG. 3.

FIGS. 4 and 5 show partially exploded views of the truck assembly (without the axle or the wheels attached to the axle). The truck assembly includes a base 50. The base has a horizontal mounting plane 72 (FIG. 5) adapted to mate with the underside 32 of the skateboard deck. The base may be 3.6 inches (9.1 cm) in length (along the longitudinal axis of the skateboard deck), and 2.8 inches (7.1 cm) in width. The base includes screw openings 74 for receiving screws (not shown) to secure the base to the skateboard deck. The base includes a base housing 76 that is angled with respect to the horizontal mounting surface 72 at an angle of between 30 degrees and 75 degrees. Referring to FIG. 9, which is a cross-sectional view of the assembled truck assembly, the angled base housing 76 creates a base plane 78 that is oriented into angle of between 30 degrees and 75 degrees with respect to the horizontal mounting surface. In a particular configuration illustrated, the base surface is defined by a central annular ring and a series of radial ribs 82, as seen in FIG. 4.

The base receives the near end of a kingpin 84. Those skilled in the art will recognize that several techniques are available to attach the kingpin 84 to the base 50, including providing a threaded opening in the base and matching threads on the near end of the kingpin.

A base side wall 86 extends from the base housing 76, substantially perpendicular to the base plane 78. In the embodiment illustrated, the base side wall 86 is constructed in multiple segments, and particularly in three segments, with side wall slots 88 between the segments. Each side wall slot 88 is open at its far end.

As noted above, the kingpin 84 has its near end securely affixed to the base 50 at the center of the base housing 76. The kingpin 84 is elongate and substantially cylindrical. The axis of the kingpin extends substantially perpendicular to the angled base plane 78. Thus, the kingpin forms an acute angle of between 30 and 75 degrees, and preferably approximately 45 degrees, with respect to the horizontal mounting plane of the base.

Figure 8:
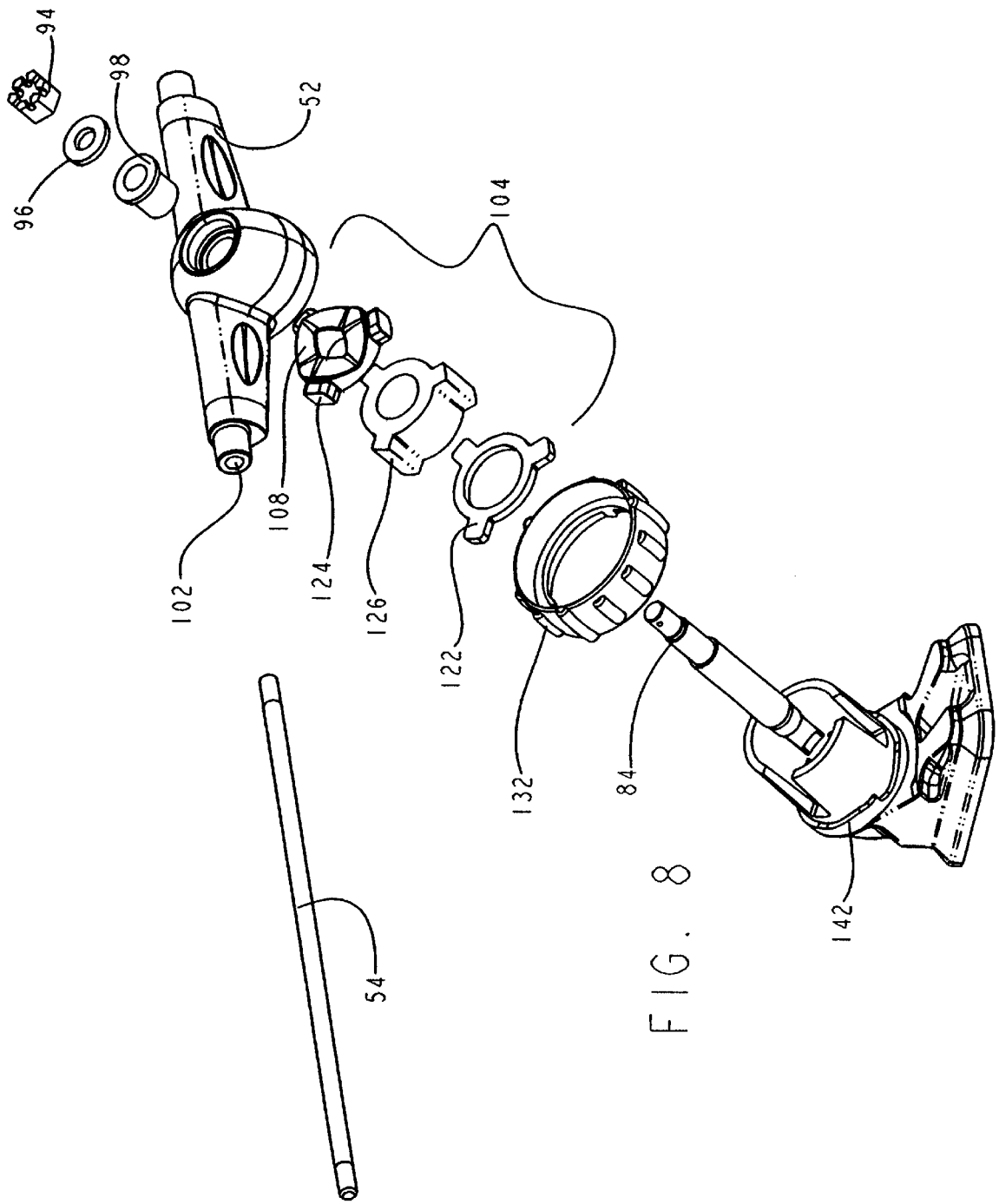
FIG. 8 is in an exploded view of the truck assembly.

An axle housing 52 is attached to the far end of the kingpin so that the axle housing at the kingpin is maintained a fixed predetermined distance from the base plane 78. The axle housing has a top opening 92 through which the far end of the kingpin 84 fits. A snap ring 94 and washer 96 (see FIG. 8) secure the kingpin 84 to the axle housing 52. A Cotter key, a screw attachment with internal threading in the kingpin, or a hex nut with external threading of the kingpin may also be used to secure the axle housing to the end of the kingpin. The attachment between the kingpin and the axle housing permits the axle housing to rotate about the kingpin axis, and to tilt with respect to the kingpin. A bushing 98 (FIG. 8) surrounds the far end of the kingpin to help position the kingpin 94 in the top opening 92 of the axle housing. The bushing 98 may be formed of polyurethane, or, preferably, bronze or steel.

The axle housing 52 has a transverse axle opening 102 for receiving an elongate axle 54. The axle housing may be 8.5 inches (22 cm) in width between the ends of the axle opening 102. The axle 54 may be a separate component that fits snugly within the axle housing so that the axle does not rotate relative to the axle housing. Referring to the cross sectional view of the assembled truck assembly shown in FIG. 9, the axle 54 is perpendicular to the kingpin 84. The axle is offset so that it is outside the acute angle between the base mounting surface and the kingpin. The axle 54 may be 11.5 inches (29 cm) from end to end.

A turning mechanism surrounds the kingpin between the base 50 and the axle housing 52. The turning mechanism includes a cam element 104 that engages a cam face 106 on the axle housing 52. As seen most clearly in FIG. 5, the cam face 106 of the axle housing is on the near side of the axle housing and includes at least two sloped cam surfaces. As seen most clearly in FIG. 4, a cam face 108 on the far side of the cam element includes a matching set of sloped cam surfaces.

The cam surfaces of the cam faces 106, 108 are oriented so that as the axle housing 52 rotates off of its center or straight-ahead position, the cam element 104 and the axle housing 52 tend to be pushed apart along the kingpin axis. The cam surfaces of each cam face are symmetrical on either side of the center position so that the turning performance is the same in both directions of rotation.

The cam element 104 engages the base side wall 86 so that the cam element 104 does not rotate relative to the base. In the illustrated embodiment, radial extensions 112 of the cam element fit into the openings 88 between the base side wall sections. However, the cam element 104 does have freedom to move longitudinally or axially along the kingpin.

The cam surfaces of the cam faces 106, 108 of the cam element and the axle housing are arranged so that the axle housing can rotate up to 25 degrees in either direction from the center or straight-ahead position.

The axle housing 52 is configured so that as the axle housing tilts relative to the skateboard deck and mounting base, the wheels that are attached to the ends of the axle do not rub against the underside of the deck. This distance required will depend on the size wheel used and the amount of tilting to be accommodated. For example, the distance from the plane defined by the mounting surface of the base and the center of the axle opening may be 3.5–4.0 inches (8.9–10.2 cm), and preferably approximately 3.9 inches (9.9 cm).

Referring again to FIG. 8, the truck assembly is shown with the cam element 104 further exploded. The cam element 104 includes a near end washer 122, a cam surface element 124, and a cam element bushing 126 between the cam surface element 124 and the near end washer 122. The near end washer 122 is formed of metal, and the cam surface element 124 is formed of a polymer material. The cam element bushing 126 is formed of an elastomeric material, such as polyurethane.

The cam element bushing 126 is resiliently compressible. As the axle housing 52 rotates about the kingpin axis, and the cam surfaces push the cam element 104 away from the axle housing, the cam element bushing is compressed, as the axial position of the axle housing 52 is fixed relative to the base. The compressed cam element bushing 126 tends to push the axle housing 52, rotating the axle housing back to its center or straight ahead position.

The washer 122, the cam element bushing 126, and the cam surface element 124 all have radial extensions that together form the radial extensions 112 of the cam element 104. The base side wall 86 surrounds the cam element 104 to minimize the deformation of the elastomeric cam element bushing 126.

Changing the pressure applied to the cam element 104 changes the turning characteristics of the truck assembly. Generally, the greater the pressure on the cam element 104, the harder it is to rotate the axle housing 52 from its center, straight-ahead position. Increased pressure on the cam element 104 pre-compresses the cam element bushing 126. So pre-compressing the bushing 126 causes the bushing to provide greater resistance to further compression as the axle housing 52 rotates off its center position. The additional compression induced by the rotation of the axle housing 52 relative to the cam elements 104 provides a stronger force to return the axle housing to its center position. Therefore, a tool-less pressure adjustment mechanism for changing the pressure is provided between the base and the cam element.

The pressure adjustment mechanism includes an adjustment ring 132 surrounding the base side walls 86 between the base 50 and the radial projections 112 of the cam element. The adjustment ring 132 engages the base 50 so that as the adjustment ring 132 is rotated relative to the base, the distance between the angled base plane 78 (FIG. 9) and the adjustment ring changes, to move the adjustment ring longitudinally with respect to the kingpin. This longitudinal movement of the adjustment ring changes the pressure applied to the near side of the cam element 104. As the adjustment ring moves along the kingpin away from the angled base plane, it increases the pressure on the cam element 104.

The outer perimeter of the base housing 76 includes a circumferential housing edge 142 that extends from the base substantially perpendicular to the angled base plane 78. The housing edge 142 is radially external to the base side wall 86, and include a series of sloped surfaces 143 leading to retention notches 144, 145, 146, 147 at different heights relative to the base plane. The retention notches 144, 145, 146, 147 provide systematic steps for positioning the adjustment ring relative to the base.

A first retention notch 144 is lowest with respect to the base, a second retention notch 145 is at a higher position with respect to the base, and so forth. In a particular embodiment illustrated, a pattern of four retention notches 144, 145, 146, 147 extends around one third of the circumference of the base housing (120 degrees). This pattern is repeated three times around the circumference of the base housing. Thus, three retention notches are located at each height relative to the base, spaced 120 degrees apart. It will be apparent upon reading the following description that different numbers of retention notches may be used, though the notches at a particular height relative to the base plane are preferably equally spaced to provide rotational symmetry.

The adjustment ring has an inward protruding rim 152 that has a near side facing the base, and a far side. The near side of the rim 152 includes lobes 154 that engage the sloped surfaces and retention notches of the base housing edge. The adjustment lobes 154 on the near side of the rim slide along the ramped edges 143 of the base, and are adapted to fit in the adjustment notches 144, 145, 146, 147. The number of adjustment lobes 154 on the rim 152 of the adjustment ring 132 is the same as the number of repeated patterns of adjustment notches on the base. Thus, the embodiment illustrated has three adjustment lobes 154 spaced at 120 degree intervals. As the adjustment lobes 154 move along the ramped edges 143 of the base, the position of the adjustment ring relative to the angled base plane changes. Since the adjustment lobes on the near side of the adjustment ring and the repeated pattern of retention notches in the base edge are spaced at the same interval, the adjustment ring remains parallel to the angled base plane.

The inner diameter of the rim 152 of the adjustment ring is larger than the diameter of the base side wall 86, so that the adjustment ring 132 fits over and outside of the base side wall. The far side of the rim 152 is smooth, and slidably engages the near side of the radial extensions of the cam element 104, and of the near side washer 122 in particular. The outer surface of the adjustment ring includes grasping elements such as knobs 156. A person may use the knobs 156 to grasp the adjustment ring with the person's hand and rotate the adjustment ring 132 relative to the base 50.

Referring further to FIG. 9, the rider of a skateboard having the wheeled truck assembly described may adjust the turning characteristics provided by the interaction of the cam faces 106, 108 by rotating the adjustment knob 132 to position the adjustment ring a different distance from the base plane along the kingpin axis. As the user rotates the adjustment ring 132, the lobes 154 on the rim of the adjustment ring engage a different set of the retention notches 144, 145, 146, 147. Since each set of retention notches is at a different distance from the base plane 78, and the pivot point at which the far end of the kingpin 84 is attached to the axle housing 52 is generally fixed, moving the adjustment ring longitudinally along the kingpin changes the pressure applied to the cam element 104, which changes the amount of force required to pivot the axle housing 52 a particular amount about the kingpin 84.

Rotating the adjustment knob 132 so that the adjustment ring is farther from the base plane (such as placing the lobes 154 in the third or fourth retention notches 146, 147) increases the pressure on the near side of the cam element 104. This increased pressure on the cam element 104 tends to make turning the axle housing relative to the kingpin axis more difficult. Thus, the skateboard rider must apply greater pressure to achieve a given level of turning. Conversely, rotating the adjustment ring until it engages a set of retention notches that are closer to the angled base plane (such as placing the lobes 154 in the first or second retention notches 144, 145) reduces the pressure on the cam element 104. Reducing that pressure consequently renders rotation of the axle housing relative to the kingpin easier.

Use of Skateboard

In using a skateboard incorporating the present invention, a rider stands on the upper surface of the skateboard deck 30. The wheels 56 rest on the ground surface. As the user stands on the skateboard deck, the user shifts his or her weight to the left side or the right side of the skateboard deck to steer the skateboard. As the rider shifts weight to the left side 38 of the skateboard deck (FIG. 3), the skateboard deck 30 tends to tilt toward the left. As the deck (which is secured to the base 50 of the truck assemblies) tilts toward the left, the kingpin and the axle housing 52 cause the axle housing of the front truck assembly 40 to rotate in a counter clockwise direction about the kingpin axis, to steer the wheels attached to the ends of the axle so that they point toward the left. In an embodiment in which the front and rear truck assemblies 40, 42 are configured to rotate in opposite directions, such tilting of the skateboard deck 30 toward the left causes the axle housing of the rear truck assembly 42 (FIG. 2) to rotate in a clockwise direction, so that the rear wheels point toward the right relative to the longitudinal axis of the skateboard deck. Such counter rotation of the front and rear axles provides a shortened turning radius for the skateboard.

Similarly, as the rider shifts weight to the right side 39 of the skateboard deck 30, the skateboard deck tends to tilt toward the right. As the deck tilts toward the right, the kingpin and the axle housing cause the axle housing of the front truck assembly to rotate in a clockwise direction, steering the wheels that are attached to the ends of the axle so that the wheels point toward the right. The tilting of the skateboard deck toward the right causes the axle housing of the rear truck assembly to rotate in a counter clockwise direction, so that the rear wheels point toward the left relative to the longitudinal axis of the skateboard deck. Such counter rotation of the front and rear axles permits the skateboard to be turn in a shortened turning radius to the right.

To change the turning characteristics of the skateboard, the rider grasps the knobs 156 of the adjustment ring 132 and rotates the adjustment ring to change its longitudinal position relative to the kingpin 84, thereby changing the pressure applied to the elastomeric bushing of the cam element 104. Referring to the view shown in FIG. 4, if the rider rotates the adjustment ring counter clockwise relative to the base 50 (as viewed from the base), the adjustment lobes 154 on the adjustment ring move along the slanted rim 143 of the base, moving the adjustment ring 132 away from the base and toward the axle housing. This movement increases the pressure on the cam element. The rider selects one of the retention notches 144, 145, 146, 147 in which to have the adjustment lobes 154 remain. If the adjustment ring is further rotated in a counter clockwise direction after reaching the fourth retention notch 147, the adjustment ring drops back to the first retention notch 144, in which the adjustment ring is closest to the base, and applies the least pressure to the cam element.

Changing the position of the adjustment ring 132 to increase the pressure on the cam element 104 compresses the cam element bushing 126. As the cam element bushing 126 is more compressed by the adjustment of the adjustment ring 132, the cam element bushing 126 more strongly resists further compression, which means that the rider must apply more force to rotate the axle housing about the kingpin.

Those skilled in the art will recognize that various modifications can be made to the specific embodiment described above and shown in the drawings. For example, with the above teaching, those skilled in the art will recognize that various modifications to the cam element, the axle housing, the adjustment ring, and the base may be made without departing from the spirit of the invention. Therefore, the above description of a particular embodiment should not be construed as limiting of the scope of the invention as defined in the following claims.

We claim:

1. A truck assembly comprising:
    an axle housing having an axle axis;
    a base having a base surface;
    a kingpin connecting the axle housing and the base, wherein the kingpin holds the axle housing and the base surface a predetermined distance apart, and wherein the kingpin has a kingpin axis;
    a turning mechanism between the axle housing and the base permitting controlled rotation of the axle housing relative to the kingpin, the turning mechanism comprising:
    a housing cam face on the axle housing, the housing cam face having at least two cam surfaces; and
    a cam element between the base and the axle housing, wherein the cam element has a cam face comprising at least two cam surfaces that engage the cam surfaces of the housing cam face, and the rotational position of the cam element relative to the base surface is fixed, and wherein the cam element is axially movable relative to the kingpin and the cam element additionally comprises an elastomeric bushing positioned between the base and the cam face of the cam element.

2. The truck assembly of claim 1, additionally comprising an adjustment mechanism for applying an adjustable pressure to the bushing of the cam element.

3. The truck assembly of claim 2, wherein the adjustment mechanism comprises:
    an adjustment surface on the base, the adjustment surface having a plurality of adjustment points, each a different distance from the base surface in a direction along the kingpin;
    a ring surrounding the kingpin, between the base surface and the tilting mechanism, wherein the ring includes adjustment lobes for engaging the adjustment surface.

4. A truck assembly comprising:
    an axle housing having an axle axis;
    a base having a base surface;
    a kingpin connecting the axle housing and the base, wherein the kingpin holds the axle housing and the base surface a predetermined distance apart, and wherein the kingpin has a kingpin axis;
    a turning mechanism permitting controlled rotation of the axle housing about the kingpin;
    an adjustment surface on the base, the adjustment surface having a plurality of adjustment points, each a different distance from the base surface in a direction along the kingpin;
    a ring surrounding the kingpin, between the base surface and the turning mechanism, wherein the ring includes adjustment lobes for engaging the adjustment surface.

5. The truck assembly of claim 4, wherein:
    each of the adjustment points comprises an indentation in the adjustment surface; and
    the adjustment surface is sloped between the indentations.

6. The truck assembly of claim 5, wherein the turning mechanism comprises:
    a housing cam face on the axle housing, the housing cam face having at least two cam surfaces; and
    a cam element between the base and the axle housing, wherein the cam element comprises a cam face having at least two cam surfaces that engage the cam surfaces of the housing cam face.

7. The truck assembly of claim 6, wherein the cam element additionally comprises an elastomeric bushing positioned between the ring and the cam face of the cam element.

8. A skateboard comprising:
    a deck having an upper surface and a lower surface, and a left side and a right side;
    front and rear truck assemblies, each truck assembly comprising:
    a base attached to the lower surface of the deck and having a base surface;
    a kingpin having a kingpin axis, the kingpin having a near end securely affixed to the base, and having a far end;

an axle housing attached to the far end of the kingpin, the axle housing having a cam surface and providing an axle axis;

a cam element between the base and axle housing, wherein the cam element engages the axle housing cam surface so that the axle housing rotates with respect to the kingpin axis;

an adjustment ring between the base and the cam element, wherein the position of the adjustment ring along the kingpin axis is adjustable to adjust the freedom of movement of the cam element and the axle housing cam surface to one another;

said cam element having a cam face comprising at least two cam surfaces that engage the housing cam surface, and the position of the cam element relative to the base surface is fixed, and wherein the cam element is axially movable relative to the kingpin and includes an elastomeric bushing positioned between the base and the cam face of the cam element.

9. The skateboard of claim 8, wherein the axle housing cam surfaces and the cam elements of the front and rear truck assemblies are angled in opposite directions so that the front axle and rear axle pivot in opposite directions when the axle housings tilt in the same direction.

10. A wheeled skateboard truck assembly, comprising:

a base including:
  a horizontal mounting surface adapted for attachment to the underside of a deck;
  a base plane, wherein the base plane is oriented at an angle between 30 and 75 degrees with respect to the horizontal mounting surface; and
  ramped edges extending from the angled base plane and having a plurality of retention notches at different heights relative to the base plane;
  a base sidewall extending substantially perpendicular from the angled base plane;

a kingpin securely attached to the base and extending substantially perpendicular from the angled base plane;

an adjustment ring surrounding the kingpin, the adjustment ring having a near side and a far side, wherein the near side of the adjustment ring has adjustment lobes for engaging the ramped edges and retention notches of the base to vary the position of the adjustment ring relative to the base plane;

a washer having a near side that engages the far side of the adjustment ring, and having a far side;

an elastomer ring surrounding the kingpin, the elastomer ring having a near side that engages the far side of the washer, and having a far side, wherein the elastomer ring is substantially surrounded by the base sidewall;

a cam element surrounding the kingpin, the cam element having a substantially smooth near surface that engages the far side of the elastomer ring, and additionally having a cam face with one or more angled cam surfaces;

an axle housing for containing an axle, wherein the axle housing is securely attached to the kingpin to maintain a fixed distance along the kingpin between the base surface and the axle housing, and wherein the axle housing includes a housing cam face having one or more cam surfaces that engage the cam surfaces of the cam element so that as the axle housing surfaces rotates relative to the kingpin axis, the cam element is pushed away from the axle housing along the kingpin axis to compress the elastomer ring.

11. The skateboard truck assembly of claim 10, wherein the rotational position of the cam element relative to the angled base plane is fixed.

12. The skateboard truck assembly of claim 10, wherein the cam element engages the base side walls to fix the rotational position of the cam element relative to the angled base surface.

13. The skateboard truck of claim 12, wherein the elastomer ring engages the side wall of the base to reduce twisting of the elastomer ring relative to the base surface.

14. The skateboard truck assembly of claim 13, wherein the cam element engages the base side walls to permit axial movement of the cam element relative to the kingpin.

* * * * *